(12) United States Patent  (10) Patent No.: US 8,612,937 B2
Dudek et al.  (45) Date of Patent: Dec. 17, 2013

(54) SYNCHRONOUSLY DEBUGGING A SOFTWARE PROGRAM USING A PLURALITY OF VIRTUAL MACHINES

(75) Inventors: Clark A. Dudek, Raleigh, NC (US); Kobina K. Inkumsah, Lansing, MI (US); David B. Roberts, Cary, NC (US); Adrian X. Rodriguez, Durham, NC (US); Ping Zhou, Poughkeepsie, NY (US)

(73) Assignee: International Business Corporation, Armonk, NY (US)

( * ) Notice: Subject to any disclaimer, the term of this patent is extended or adjusted under 35 U.S.C. 154(b) by 286 days.

(21) Appl. No.: 13/217,826

(22) Filed: Aug. 25, 2011

(65) Prior Publication Data

US 2013/0055206 A1  Feb. 28, 2013

(51) Int. Cl.
 *G06F 9/44*  (2006.01)

(52) U.S. Cl.
 USPC .......................................................... 717/124

(58) Field of Classification Search
 USPC .......................................................... 717/124
 See application file for complete search history.

(56) References Cited

U.S. PATENT DOCUMENTS

| | | | |
|---|---|---|---|
| 5,428,618 A | 6/1995 | Ueki et al. | |
| 6,141,794 A | 10/2000 | Dice et al. | |
| 6,625,751 B1 | 9/2003 | Starovic et al. | |
| 6,633,862 B2 | 10/2003 | Thompson | |
| 6,738,977 B1 | 5/2004 | Berry et al. | |
| 6,832,367 B1 | 12/2004 | Choi et al. | |
| 6,850,953 B1 | 2/2005 | Deshpande et al. | |
| 7,228,452 B2 | 6/2007 | Moser et al. | |
| 7,840,785 B1 | 11/2010 | Tene et al. | |
| 2005/0251794 A1 | 11/2005 | Taylor et al. | |
| 2006/0206873 A1* | 9/2006 | Argade | 717/135 |
| 2008/0127200 A1* | 5/2008 | Richards et al. | 718/106 |
| 2009/0204384 A1* | 8/2009 | Akiba et al. | 703/28 |
| 2010/0325500 A1* | 12/2010 | Bashir et al. | 714/746 |
| 2012/0174077 A1* | 7/2012 | Lindahl et al. | 717/128 |
| 2012/0317550 A1* | 12/2012 | Lindahl et al. | 717/128 |
| 2013/0042150 A1* | 2/2013 | McNeeney | 714/38.1 |
| 2013/0042153 A1* | 2/2013 | McNeeney | 714/38.1 |

* cited by examiner

*Primary Examiner* — Philip Wang
(74) *Attorney, Agent, or Firm* — H. Barrett Spraggins; Katherine S. Brown; Biggers Kennedy Lenart Spraggins LLP

(57) ABSTRACT

Methods, apparatuses, and computer program products for synchronously debugging a software program using a plurality of virtual machines are provided. Embodiments include controlling, by a master debugging module operating on a first virtual machine, execution of the software program within the first virtual machine; controlling, by a slave debugging module operating on a second virtual machine, execution of the software program within the second virtual machine including delaying execution of the software program within the second virtual machine relative to the execution of the software program within the first virtual machine; detecting, by the master debugging module, an error in the execution of the software program within the first virtual machine; and in response to the detection of the error, capturing, by a hypervisor, a snapshot of the second virtual machine.

18 Claims, 4 Drawing Sheets

SYNCHRONOUSLY DEBUGGING A SOFTWARE PROGRAM USING A PLURALITY OF VIRTUAL MACHINES

BACKGROUND OF THE INVENTION

1. Field of the Invention

The field of the invention is data processing, or, more specifically, methods, apparatuses, and computer program products for synchronously debugging a software program using a plurality of virtual machines.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is the set of software tools referred to as debuggers. A debugger is an application that controls operation of another application—a debuggee—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables. After a crash, developers want to see the state of an application immediately before the crash. To do so, developers typically have to execute the debugger repeatedly to recreate the crash and inspect the environment before the crash. This causes the developer to lose time recreating all of the steps leading up to the crash.

SUMMARY OF THE INVENTION

Methods, apparatuses, and computer program products for synchronously debugging a software program using a plurality of virtual machines are provided. Embodiments include controlling, by a master debugging module operating on a first virtual machine, execution of the software program within the first virtual machine; controlling, by a slave debugging module operating on a second virtual machine, execution of the software program within the second virtual machine including delaying execution of the software program within the second virtual machine relative to the execution of the software program within the first virtual machine; detecting, by the master debugging module, an error in the execution of the software program within the first virtual machine; and in response to the detection of the error, capturing, by a hypervisor, a snapshot of the second virtual machine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatuses, and computer program products for synchronously debugging a software program using a plurality of virtual machines in accordance with the present invention are described with reference to the accompanying drawings, beginning with FIG. 1. Synchronously debugging a software program using a plurality of virtual machines in accordance with the present invention is generally implemented with computers, that is, with automated computing machinery.

Figure 1:
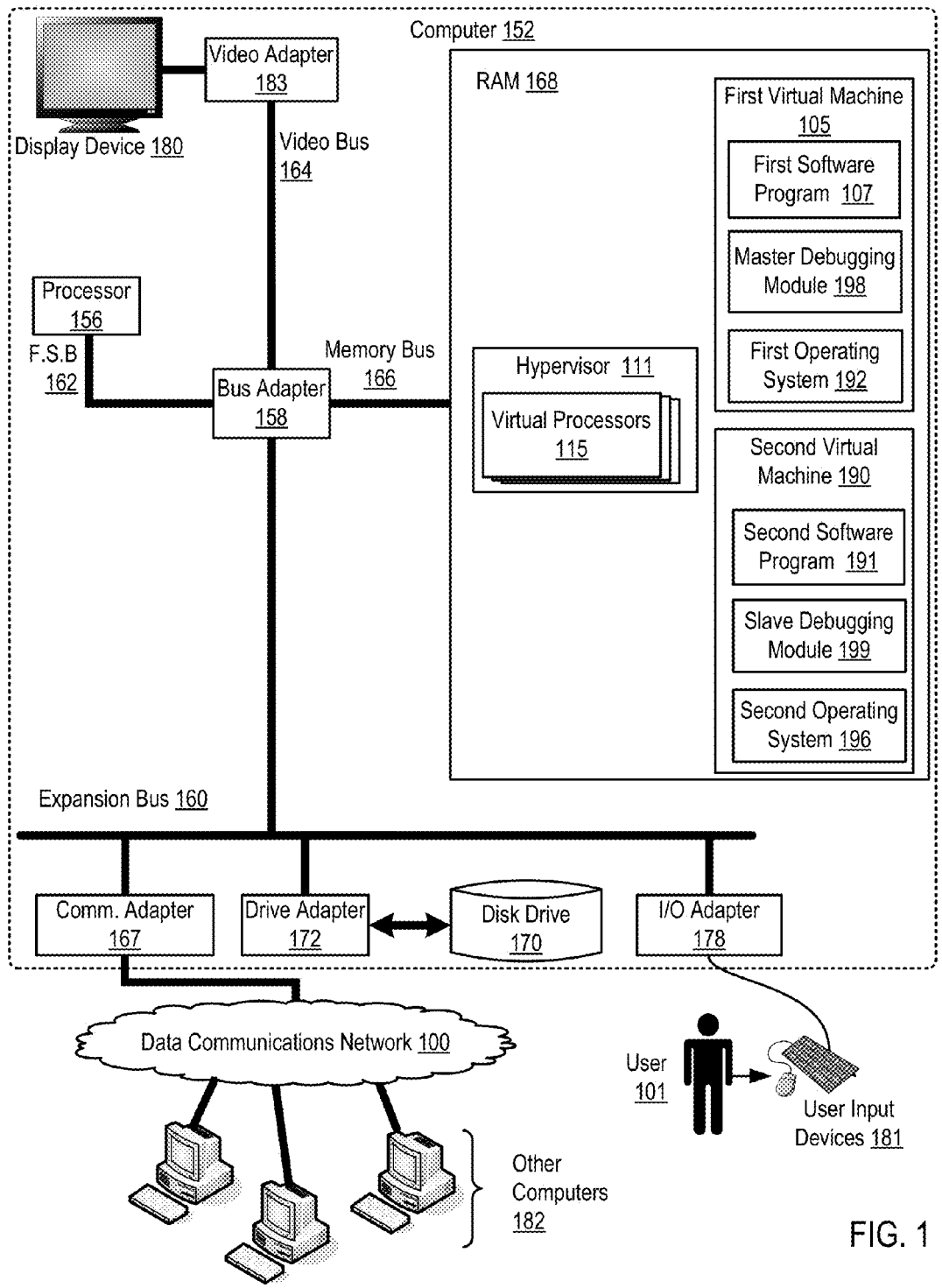
FIG. 1 sets forth a diagram of automated computing machinery comprising an exemplary computer useful in synchronously debugging a software program using a plurality of virtual machines according to embodiments of the present invention.

FIG. 1 sets forth a block diagram of automated computing machinery comprising an exemplary computer (152) useful in synchronously debugging a software program using a plurality of virtual machines according to embodiments of the present invention. The computer (152) of FIG. 1 includes at least one computer processor (156) or 'CPU' as well as random access memory (168) (RAM') which is connected through a high speed memory bus (166) and bus adapter (158) to the processor (156) and to other components of the computer (152).

Stored in RAM (168) is a hypervisor (111), a first operating system (192), a second operating system (196), a master debugging module (198), a slave debugging module (199), a first software program (107), and a second software program (191). Each software program (107, 191) is a set of computer program instructions implementing user-level data processing. The hypervisor (111) stored in RAM (168) is a layer of system software that runs on the computer hardware beneath an operating system layer to allow multiple operating systems to run, unmodified, on a host computer at the same time. The hypervisor (111) provides each operating system with a set of virtual resources by allocating these resources to each operating system using virtual machines. A virtual machine— sometimes referred to as a logical partition ('LPAR')—is a set of data structures and services that enables distribution of computer resources within a single computer to make the computer function as if it were two or more independent computers.

In order to allow multiple operating systems to run at the same time, the hypervisor (111) assigns virtual processors (115) to each operating system (192, 196) and schedules virtual processors (115) on the physical processors of the computer (152). A virtual processor is a subsystem that implements assignment of processor time to a logical partition. In the example of FIG. 1, one processor (156) is illustrated, however, according to embodiments of the present invention, a shared pool of physical processors may support the assignment of partial physical processors (in time slices) to a logical partition. Such partial physical processors shared in time slices are referred to as 'virtual processors.' A thread of execution is said to run on a virtual processor when it is running on the virtual processor's time slice. Sub-processor partitions time-share a physical processor among a set of virtual processors, in a manner that is invisible to an operating system running in a logical partition. Unlike multiprogramming within the operating system where a thread can remain in control of the physical processor by running in interrupt-disabled mode, in sub-processor partitions, the thread is still pre-empted by the hypervisor at the end of its virtual processor's time slice, in order to make the physical processor available to a different virtual processor.

In the example of FIG. 1, the hypervisor (111) allocates virtual resources to the first virtual machine (105) that provides an execution environment for the first operating system (192), the first software program (107), and the master debugging module (198). In addition, the hypervisor (111) of FIG. 1 also allocates virtual resources to the second virtual machine (190) that provides an execution environment for the second operating system (196), the second software program (191), and the slave debugging module (199).

The first operating system (192) of FIG. 1 is system software that manages the virtual resources allocated to the first virtual machine (105) by the hypervisor (111) and the second operating system (196) is system software that manages the virtual resources allocated to the second virtual machine (190) by the hypervisor (111). The operating systems (192, 196) perform basic tasks such as, for example, controlling and allocating virtual memory, prioritizing the processing of instructions, controlling virtualized input and output devices, facilitating networking, and managing a virtualized file system.

The master debugging module (191), the slave debugging module (199), and the hypervisor (111) are configured to operate together for synchronously debugging a software program using a plurality of virtual machines according to embodiments of the present invention. In the example of FIG. 1, both the first virtual machine (105) and the second virtual machine (190) are identical as are both the master debugging module (191) and the slave debugging module (199). In addition, both the first software program (107) and the second software program (191) are identical. That is, the computer (152) is configured to execute in two separate virtual machines (105, 190) identical debugging modules (198, 199) controlling identical software programs (107, 191). By debugging the software program within identical environments, the debuggers will arrive at the same results if both are allowed to execute concurrently the software programs until detecting an error in execution of the software programs.

Both the master debugging module (191) and the slave debugging module (199) are software program debuggers. A debugger is an application that controls operation of another application—a debuggee—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

Specifically, the master debugging module (191) includes computer program instructions that when executed by the processor (156) cause the computer to carry out the step of: controlling, by the master debugging module (191) operating on the first virtual machine (105), execution of a software program (107) within the first virtual machine (105). The slave debugging module (199) includes computer program instructions that when executed by the processor (156) cause the computer to carry out the step of controlling, by the slave debugging module (199) operating on the second virtual machine (190), execution of the software program (191) within the second virtual machine (190) including delaying execution of the software program (191) within the second virtual machine (190) relative to the execution of the software program (192) within the first virtual machine (105).

The master debugging module (191) also includes computer program instructions that when executed by the processor (156) cause the computer to carry out the step of: detecting, by the master debugging module (198), an error in the execution of the software program (107) within the first virtual machine (105). The hypervisor (111) includes computer program instructions that when executed by the processor (156) cause the computer to carry out the step of in response to the detection of the error, capturing, by the hypervisor (111), a snapshot of the second virtual machine (190). A snapshot is a file-based representation of the state of a virtual machine at a given time. A snapshot may indicate the virtual machine's power state and data, such as all the files that make-up the virtual machine including disks, memory, and other devices. Because the execution of the second software program is delayed, the snapshot of the second virtual machine (190) indicates a state of the first virtual machine (105) immediately before the crash of the first computer program on the first virtual machine. The saved snapshot allows developers to immediately view the state of the software program before the crash without having to recreate the crash on the first virtual machine, thus saving the developers time and increasing the efficiently of the debugging process.

The software programs (107, 191), the operating systems (108, 196, 196), the debugging modules (198, 199), and the hypervisor (111) illustrated in FIG. 1 are software components, that is computer program instructions. Operating systems that may be improved for providing policy-based operating system services in a hypervisor on a computing system in accordance with the present invention may include UNIX™, Linux™ Microsoft NT™, IBM's AIX™ IBM's i5/OS™ and others as will occur to those of skill in the art. The software programs (107, 191), the operating systems (108, 196, 196), the debugging modules (198, 199), and the hypervisor (111) in the example of FIG. 1 are shown in RAM (168), but many components of such software typically are stored in non-volatile memory also, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for synchronously debugging a software program using a plurality of virtual machines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as input from a user (101) on user input devices (181) such as keyboards and mice. The example computer (152) of FIG. 1 includes a video adapter (183), which is an example of an I/O adapter specially designed for graphic output to a display device (180) such as a display screen or computer monitor. The video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for synchronously debugging a software program using a plurality of virtual machines according to embodiments of the present invention include modems for wired dial-up communications, Ethernet (IEEE 802.3) adapters for wired data communications network communications, and 802.11 adapters for wireless data communications network communications.

Figure 2:
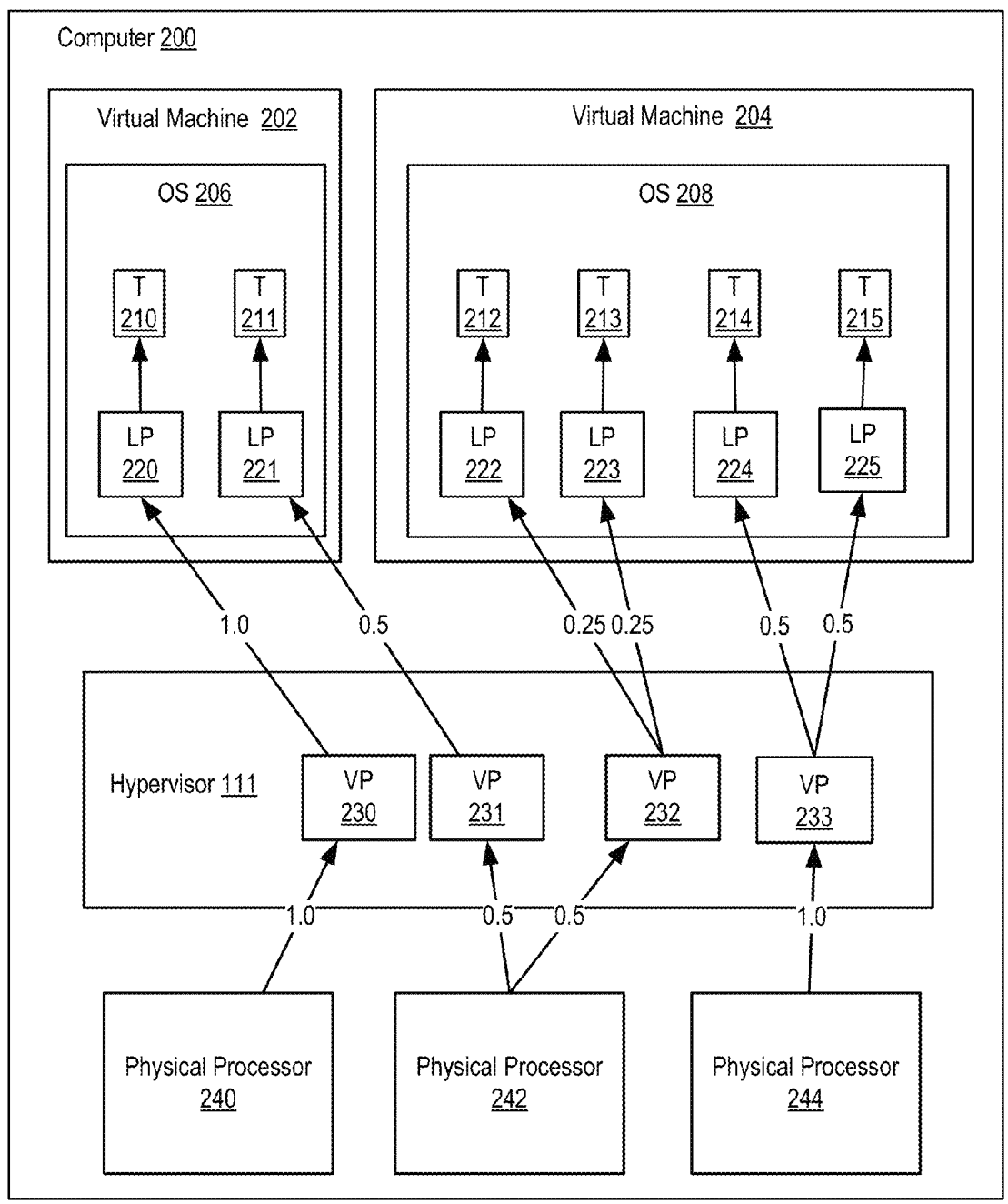
FIG. 2 sets forth a diagram illustrating an exemplary computer configured with a hypervisor useful in synchronously debugging a software program using a plurality of virtual machines according to embodiments of the present invention.

For further explanation of allocating virtual processors to logical partitions by the hypervisor, FIG. 2 sets forth a diagram illustrating an exemplary computer configured with a hypervisor useful in synchronously debugging a software program using a plurality of virtual machines according to embodiments of the present invention.

The system of FIG. 2 includes virtual machine (VM) (202) and VM (204). The system of FIG. 2 includes two operating systems (206, 208), one each in VM (202) and VM (204) respectively. The system of FIG. 2 includes six logical processors (220-225), two for operating system (206) in VM (202) and four for operating system (208) in VM (204). A logical processor is an operating system's structure for scheduling threads for execution. It represents a portion of the resources of a processor that is capable of carrying out the execution of a thread. Six threads (210-215) run on the six logical processors (220-225) respectively, one thread per logical processor. The system of FIG. 2 includes a hypervisor (111) and four virtual processors, two virtual processors (230, 231) assigned to VM (202) and two virtual processors (232, 233) assigned to VM (204).

The system of FIG. 2 also includes three physical processors (240, 242, 244). In the examples in this specification, the physical processors (240, 242, 244) are shared according to processing units with 1.0 processing units representing the processing capacity of one physical processor. In this example, the processing capacity of the three physical processors (240, 242, 244) is apportioned to the VMs as follows:

All of the processing capacity of physical processor (240) is assigned entirely to virtual processor (230), so that logical processor (220) has available to it the entirety of physical processor (240).

One-half the processing capacity of physical processor (242) is assigned to virtual processor (231), so that logical processor (221) has available to it in time slices one-half of physical processor (242).

One-half the processing capacity of physical processor (242) is assigned to virtual processor (232). Virtual processor (232) is assigned to VM (204) which runs in simultaneous multithreading mode with two logical processors (222, 223) for virtual processor (232). Logical processor (222) and logical processor (223) each has available to it in time slices one-fourth of the processing capacity of physical processor (242).

All of the processing capacity of physical processor (244) is assigned to virtual processor (233). Virtual processor (233) is assigned to VM (204) which runs in simultaneous multithreading mode with two logical processors (224, 225) for virtual processor (233). Logical processor (224) and logical processor (225) each has available to it in time slices one-half of the processing capacity of physical processor (244).

The number, arrangement, and assignments of physical processors, virtual processors, and logical processors in the system of FIG. 2 are for explanation only, and not for a limitation of the present invention. A computer useful for synchronously debugging a software program using a plurality of virtual machines according to embodiments of the present invention may support a multiplicity of logical partitions and may include any number, arrangement, or assignment of physical processors, virtual processors, and logical processors.

Figure 3:
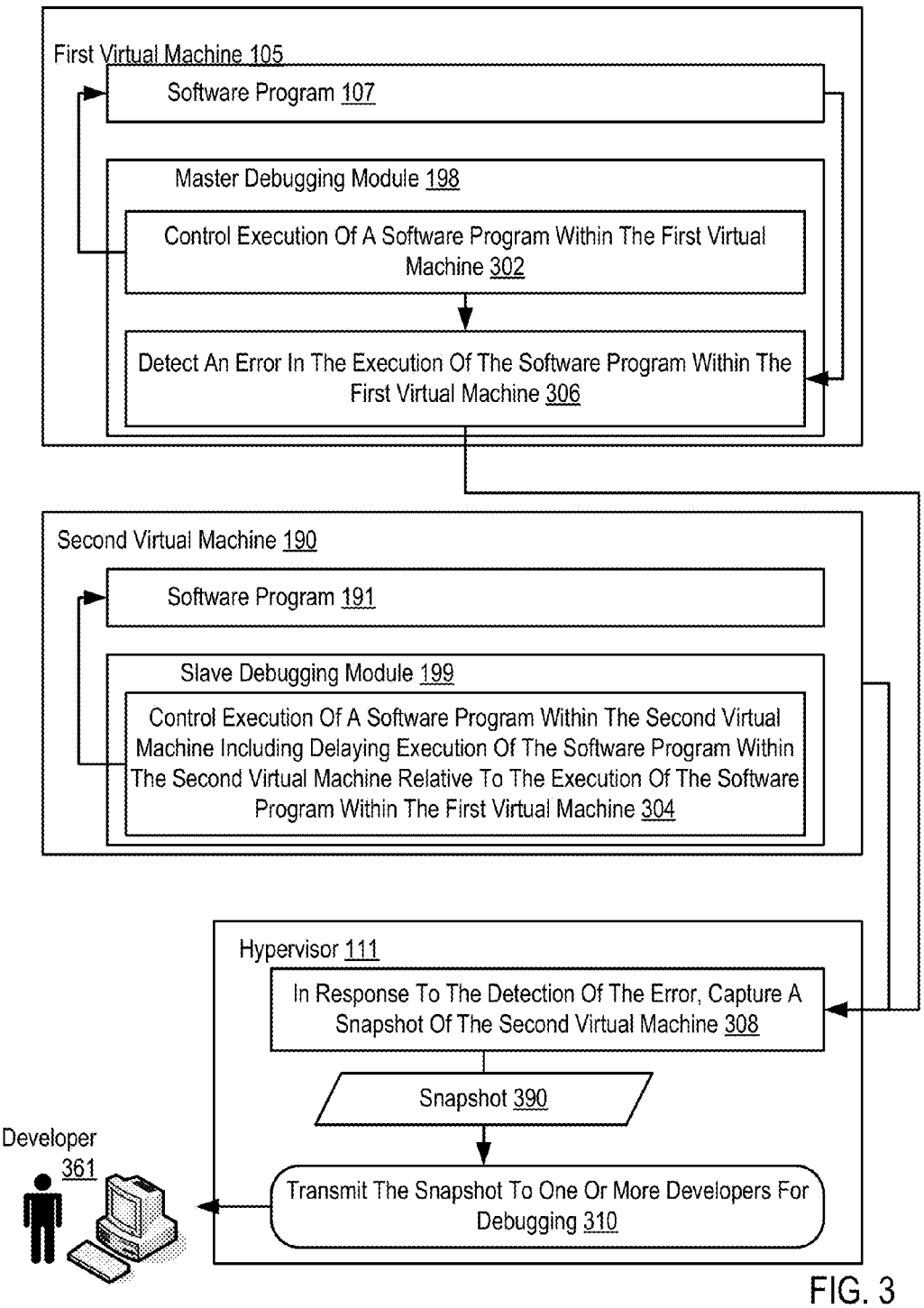
FIG. 3 sets forth a flow chart illustrating an exemplary method for synchronously debugging a software program using a plurality of virtual machines according to embodiments of the present invention.

For further explanation, FIG. 3 sets forth a flow chart illustrating an exemplary method for synchronously debugging a software program using a plurality of virtual machines according to embodiments of the present invention. The method of FIG. 3 includes controlling (302), by a master debugging module (198) operating on a first the first virtual machine (105), execution of the software program (107) within the first the first virtual machine (105). Controlling (302) execution of the software program (107) within the first virtual machine (105) may be carried out by any typical debugging operation such running a program step by step (single-stepping or program animation), stopping, breaking, or pausing the program to examine the current state, at some event or specified instruction by means of a breakpoint, and tracking the values of some variables, and so on as will occur to readers of skill in the art.

The method of FIG. 3 includes controlling (304), by a slave debugging module (199) operating on a second virtual machine (190), execution of the software program (191)

within the second virtual machine (190) including delaying execution of the software program (191) within the second virtual machine (190) relative to the execution of the software program (107) within the first the first virtual machine (105). Controlling (304) execution of the software program (191) within the second virtual machine (190) may be carried out by any typical debugging operations such running a program step by step (single-stepping or program animation), stopping, breaking, or pausing the program to examine the current state, at some event or specified instruction by means of a breakpoint, and tracking the values of some variables, and so on as will occur to readers of skill in the art.

Delaying execution of the software program (191) within the second virtual machine (190) relative to the execution of the software program (107) within the first virtual machine (105) may be carried out by starting the execution of the software program on the second virtual machine after the starting execution of the software program on the first virtual machine.

The method of FIG. 3 includes detecting (306), by the master debugging module (198), an error in the execution of the software program (191) within the first the first virtual machine (105). Detecting (306) an error in the execution of the software program (191) within the first virtual machine (105) may be carried out by determining that the software program has attempted to read or write memory that is not allocated for reading or writing by that software program (segmentation fault) or x86 specific (general protection fault); attempted to execute privileged or invalid instructions; attempted to perform I/O operations on hardware devices to which it does not have permission to access; passed invalid arguments to system calls; attempted to access other system resources to which the application does not have permission to access (bus error); attempted to execute machine instructions with bad arguments (depending on CPU architecture): divide by zero, operations on denorms or NaN values, memory access to unaligned addresses, and others as will occur to those of skill in the art.

The method of FIG. 3 includes in response to the detection of the error, capturing (308), by a hypervisor (111), a snapshot (390) of the second virtual machine (190). A snapshot may include contents of RAM, register values, cache contents, and contents of the second virtual machine's virtual disk drive. Capturing (308) a snapshot (390) of the second virtual machine (190) may be carried out by performing an operation on the hypervisor that stores all of the data and the states of the second virtual machine.

The method of FIG. 3 may also optionally include transmitting (310), by the hypervisor (111), the snapshot (390) to one or more developers (380) for debugging. Transmitting (310) the snapshot (390) to one or more developers (380) for debugging may be carried out by storing the snapshot; and transmitting the snapshot to one or more other computers via one or more communication networks.

Figure 4:
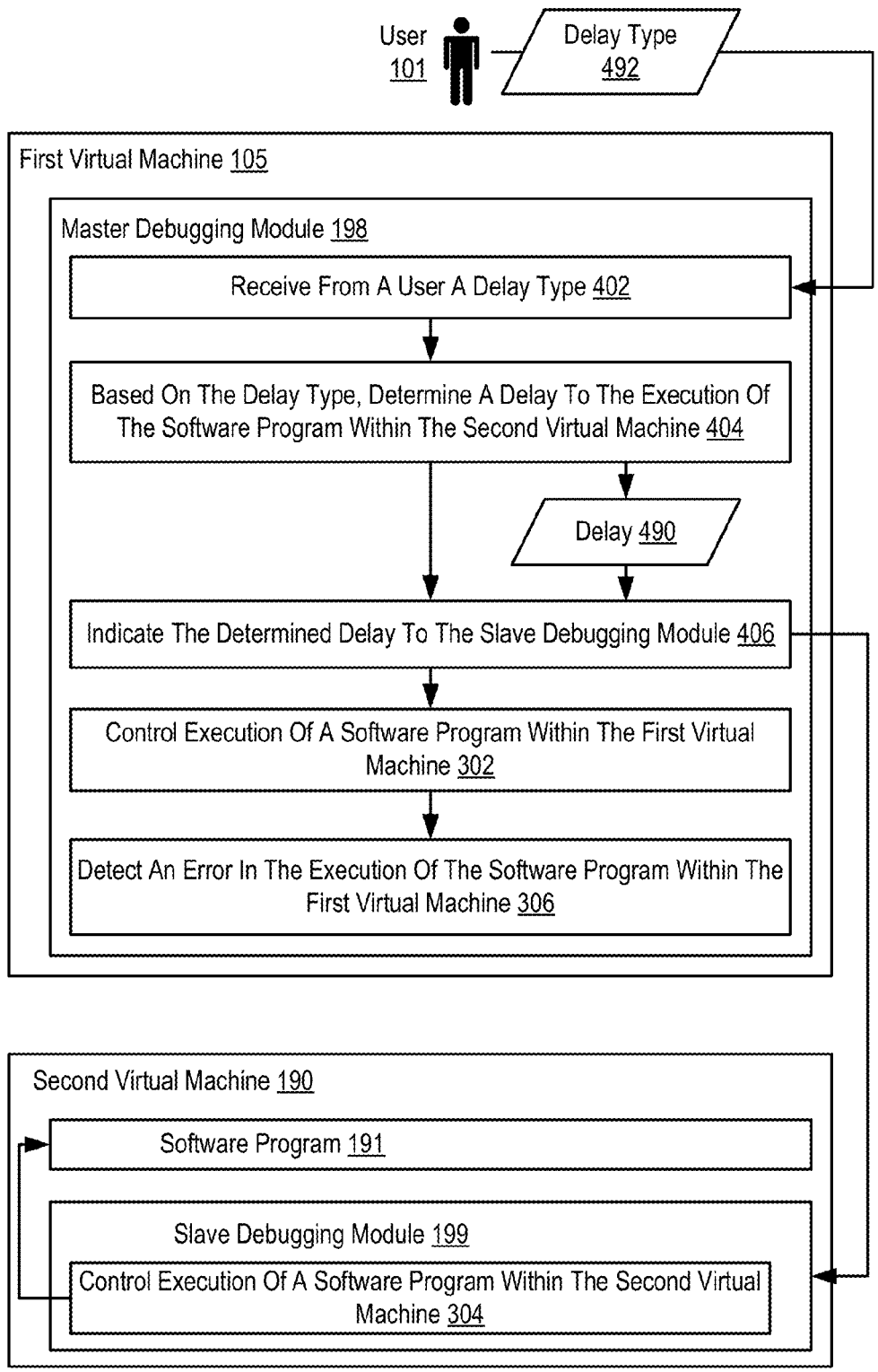
FIG. 4 sets forth a flow chart illustrating a further exemplary method for synchronously debugging a software program using a plurality of virtual machines according to embodiments of the present invention.

For further explanation, FIG. 4 sets forth a flow chart illustrating a further exemplary method for synchronously debugging a software program using a plurality of virtual machines according to embodiments of the present invention. The method of FIG. 4 is similar to the method of FIG. 3 in that the method of FIG. 4 also includes controlling (302), by a master debugging module (198) operating on a first the first virtual machine (105), execution of the software program (107) within the first the first virtual machine (105); controlling (304), by a slave debugging module (199) operating on a second virtual machine (190), execution of the software program (191) within the second virtual machine (190) including delaying execution of the software program (191) within the second virtual machine (190) relative to the execution of the software program (107) within the first the first virtual machine (105); detecting (306), by the master debugging module (198), an error in the execution of the software program (191) within the first the first virtual machine (105); and in response to the detection of the error, capturing (308), by a hypervisor (111), a snapshot (390) of the second virtual machine (190).

The method of FIG. 4 also includes receiving (402) from a user (101), by the master debugging module (198), a delay type (492). A delay type is an indication of how the user of the debugging modules wants the slave debugging module to be delayed. For example, the delay type may indicate a stopping point for the execution of the software program within the second virtual machine; or a number of computer program instructions that the execution of the software program within the second virtual machine is behind the execution of the software program within the first virtual machine. Receiving (402) from a user (101), by the master debugging module (198), a delay type (492) may be carried out by the user typing a selection into a graphical user interface before beginning debugging on the master debugging module (198) and the slave debugging module (199).

The method of FIG. 4 includes determining (404), based on the delay type (492), a delay (490) to the execution of the software program (191) within the second virtual machine (190). Determining (404) a delay (490) to the execution of the software program (191) within the second virtual machine (190) may be carried out by corresponding the type of the delay with a particular delay. For example, one particular type of delay may correspond with delaying execution of the software program on the second virtual machine to a stopping point. As another example, a second particular type of delay may correspond with delaying execution of the software program on the second virtual machine by a predetermined number of instructions behind the execution of the software program on the first virtual machine.

The method of FIG. 4 also includes indicating (406) the determined delay (490) to the slave debugging module (199). Indicating (406) the determined delay (490) to the slave debugging module (199) may be carried out by transmitting a message from the hypervisor to the slave debugging module that indicates how the delay is to be implemented.

In the example of FIG. 4, the slave debugging module (199) controls the execution of the software program (191) within the second virtual machine (190) based on the indicated delay (490). For example, the slave debugging module may have a stopping point for the execution of the software program within the second virtual machine; or may execute the software program on the second virtual machine a number of computer program instructions behind the execution of the software program within the first virtual machine.

Exemplary embodiments of the present invention are described largely in the context of a fully functional computer system for synchronously debugging a software program using a plurality of virtual machines. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method of synchronously debugging a software program using a plurality of virtual machines, the method comprising:
controlling, by a master debugging module operating on a first virtual machine, execution of a first copy of the software program within the first virtual machine;
controlling, by a slave debugging module operating on a second virtual machine, execution of a second copy of the software program within the second virtual machine including delaying execution of the second copy of the software program within the second virtual machine relative to the execution of the first copy of the software program within the first virtual machine;
detecting, by the master debugging module, an error in the execution of the first copy of the software program within the first virtual machine; and
in response to the detection of the error, capturing, by a hypervisor, a snapshot of the second virtual machine.

2. The method of claim 1 further comprising
receiving from a user, by the master debugging module, a delay type;
based on the delay type, determining a delay to the execution of the second copy of the software program within the second virtual machine; and
indicating the determined delay to the slave debugging module;
wherein the slave debugging module controls the execution of the second copy of the software program within the second virtual machine based on the indicated delay.

3. The method of claim 2 wherein the delay type indicates a stopping point for the execution of the second copy of the software program within the second virtual machine.

4. The method of claim 2 wherein the delay type indicates a number of computer program instructions that the execution of the second copy of the software program within the second virtual machine is behind the execution of the first copy of the software program within the first virtual machine.

5. The method of claim 1 wherein the snapshot comprises one of: contents of RAM, register values, cache contents, and contents of the second virtual machine's virtual disk drive.

6. The method of claim 1 further comprising transmitting, by the hypervisor, the snapshot to one or more developers for debugging.

7. Apparatus for synchronously debugging a software program using a plurality of virtual machines, the apparatus comprising a computer processor, a computer memory operatively coupled to the computer processor, the computer memory having disposed within it computer program instructions that when executed by the computer processor causes the apparatus to carry out the steps of:
controlling, by a master debugging module operating on a first virtual machine, execution of a first copy of the software program within the first virtual machine;
controlling, by a slave debugging module operating on a second virtual machine, execution of a second copy of the software program within the second virtual machine including delaying execution of the second copy of the software program within the second virtual machine relative to the execution of the first copy of the software program within the first virtual machine;
detecting, by the master debugging module, an error in the execution of the first copy of the software program within the first virtual machine; and
in response to the detection of the error, capturing, by a hypervisor, a snapshot of the second virtual machine.

8. The apparatus of claim 7 further comprising computer program instructions that when executed by the computer processor causes the apparatus to carry out the steps of:
receiving from a user, by the master debugging module, a delay type;
based on the delay type, determining a delay to the execution of the second copy of the software program within the second virtual machine; and
indicating the determined delay to the slave debugging module;
wherein the slave debugging module controls the execution of the second copy of the software program within the second virtual machine based on the indicated delay.

9. The apparatus of claim 8 wherein the delay type indicates a stopping point for the execution of the second copy of the software program within the second virtual machine.

10. The apparatus of claim 8 wherein the delay type indicates a number of computer program instructions that the execution of the second copy of the software program within the second virtual machine is behind the execution of the first copy of the software program within the first virtual machine.

11. The apparatus of claim 7 wherein the snapshot comprises one of: contents of RAM, register values, cache contents, and contents of the second virtual machine's virtual disk drive.

12. The apparatus of claim 7 further comprising computer program instructions that when executed by the computer processor causes the apparatus to carry out the steps of transmitting, by the hypervisor, the snapshot to one or more developers for debugging.

13. A computer program product for synchronously debugging a software program using a plurality of virtual machines, the computer program product disposed upon a computer readable storage medium, wherein the computer readable storage medium is not a signal, the computer program product comprising computer program instructions capable, when executed, of causing a computer to carry out the steps of:
controlling, by a master debugging module operating on a first virtual machine, execution of a first copy of the software program within the first virtual machine;
controlling, by a slave debugging module operating on a second virtual machine, execution of a second copy of the software program within the second virtual machine including delaying execution of the second copy of the software program within the second virtual machine relative to the execution of the first copy of the software program within the first virtual machine;
detecting, by the master debugging module, an error in the execution of the first copy of the software program within the first virtual machine; and
in response to the detection of the error, capturing, by a hypervisor, a snapshot of the second virtual machine.

14. The computer program product of claim 13 further comprising computer program instructions capable, when executed, of causing a computer to carry out the steps of:
receiving from a user, by the master debugging module, a delay type;
based on the delay type, determining a delay to the execution of the second copy of the software program within the second virtual machine; and
indicating the determined delay to the slave debugging module;
wherein the slave debugging module controls the execution of the second copy of the software program within the second virtual machine based on the indicated delay.

15. The computer program product of claim 14 wherein the delay type indicates a stopping point for the execution of the second copy of the software program within the second virtual machine.

16. The computer program product of claim 14 wherein the delay type indicates a number of computer program instructions that the execution of the second copy of the software program within the second virtual machine is behind the execution of the first copy of the software program within the first virtual machine.

17. The computer program product of claim 13 wherein the snapshot comprises one of: contents of RAM, register values, cache contents, and contents of the second virtual machine's virtual disk drive.

18. The computer program product of claim 13 further comprising computer program instructions capable, when executed, of causing a computer to carry out the steps of transmitting, by the hypervisor, the snapshot to one or more developers for debugging.

\* \* \* \* \*